United States Patent
Aggarwal et al.

(10) Patent No.: US 6,330,614 B1
(45) Date of Patent: Dec. 11, 2001

(54) INTERNET AND RELATED NETWORKS, A METHOD OF AND SYSTEM FOR SUBSTITUTE USE OF CHECKSUM FIELD SPACE IN INFORMATION PROCESSING DATAGRAM HEADERS FOR OBVIATING PROCESSING SPEED AND ADDRESSING SPACE LIMITATIONS AND PROVIDING OTHER FEATURES

(75) Inventors: Vijay K. Aggarwal, Marlboro; Christopher R. Young, Waltham; Himanshu C. Shah, Framingham, all of MA (US)

(73) Assignee: Nexabit Networks LLC, Marlboro, MA (US)

( * ) Notice: Subject to any disclaimer, the term of this patent is extended or adjusted under 35 U.S.C. 154(b) by 0 days.

(21) Appl. No.: 09/044,999

(22) Filed: Mar. 20, 1998

(51) Int. Cl.[7] .................. G06F 15/177; G08C 19/00; H04J 3/16
(52) U.S. Cl. .................. 709/236; 370/471; 340/825.52
(58) Field of Search .................. 709/236, 230, 709/227; 340/825.57, 825.53, 825.52; 370/470, 474, 471, 476, 229; 714/4; 710/9

(56) References Cited

U.S. PATENT DOCUMENTS

| | | | |
|---|---|---|---|
| 5,430,842 | * 7/1995 | Thompson et al. | 7809/236 |
| 5,530,472 | * 6/1996 | Bregman et al. | 348/15 |
| 5,734,654 | * 3/1998 | Shirai et al. | 370/396 |
| 5,734,865 | * 3/1998 | Yu | 709/250 |
| 5,768,543 | * 7/1998 | Hiles | 710/107 |
| 5,781,729 | * 7/1998 | Baker et al. | 709/230 |
| 5,799,016 | * 8/1998 | Onweller | 370/401 |
| 5,815,516 | * 9/1998 | Aaker et al. | 714/236 |
| 5,826,032 | * 10/1999 | Finn et al. | 709/236 |
| 5,870,384 | * 2/1999 | Salovuori et al. | 370/235 |
| 5,898,713 | * 4/1999 | Melzer et al. | 714/807 |
| 5,916,305 | * 6/1999 | Sikdar et al. | 709/236 |
| 5,918,022 | * 6/1999 | Batz et al. | 709/236 |
| 5,940,394 | * 8/1999 | Killian | 370/393 |
| 5,940,478 | * 8/1999 | Vaudreuil et al. | 379/88.18 |

(List continued on next page.)

OTHER PUBLICATIONS

RFC 1365, K. Siyan, An IP Address Extension Proposal, http://rfc.fh–koeln.de/html_gzrfc1365.html.gz, 6 pages, Sep. 1992.*
RFC 0796, J. Postel, Address Mapping, http://rfe.fh-koeln.de/rfc/html_gz/rfc0796.html.gz, 7 pages, Sep. 1981.*
RFC 0730, Jon Postel, Extensible Field Addressing, http://rfc.fh_koeln.de/rfc/html_gz/rfc0730.html.gz, 6 pages, May 20, 1977.*
ENST, "Methods for IPv4–IPv6 transition", 1998, IEEE, p. 1.*
Stallings, "IPv6: the New Internet Protocol", 1998, IEEE, pp. 1–28 (28).*
Kantor, RFC C1226, "Internet Protocol Encapsulation of AX.25 frames", May 1991, rfc–.fh–koeln.de, pp. 2.*
Topolcic, RFC 1367, "Schedule for IP Address Space Management Guidelines", Oct. 1992, rfc–.fh–koeln.de, pp. 3.*
IAB et al., RFC 1881, "IPv6 Address Allocation Management", Dec. 1995, rfc–.fh–koeln.de, pp. 10.*
Hindel et al., RFC 1884, "IPv6 Addressing Architecture", Dec. 1995, rfc–.fh–koeln.de, pp. 18.*

* cited by examiner

*Primary Examiner*—Mark H. Rinehart
*Assistant Examiner*—Bunjob Jaroenchonwanit

(57) ABSTRACT

In Internet and related networks, a method of and system for substitute use of the normal checksum field space in information processing (IP) datagram headers for obviating current processing time and addressing space limitations, involving replacing the current checksum usage in the checksum field with its attendant processing time with further source host and destination host addresses of lesser processing time, thereby increasing the address space for the network and decreasing the require header processing time, and/or providing space for autonomous system numbers, a higher layer protocol-based routing information (including of the MPLS type) or for Virtual Private Networks Indentifiers in the header.

4 Claims, 7 Drawing Sheets

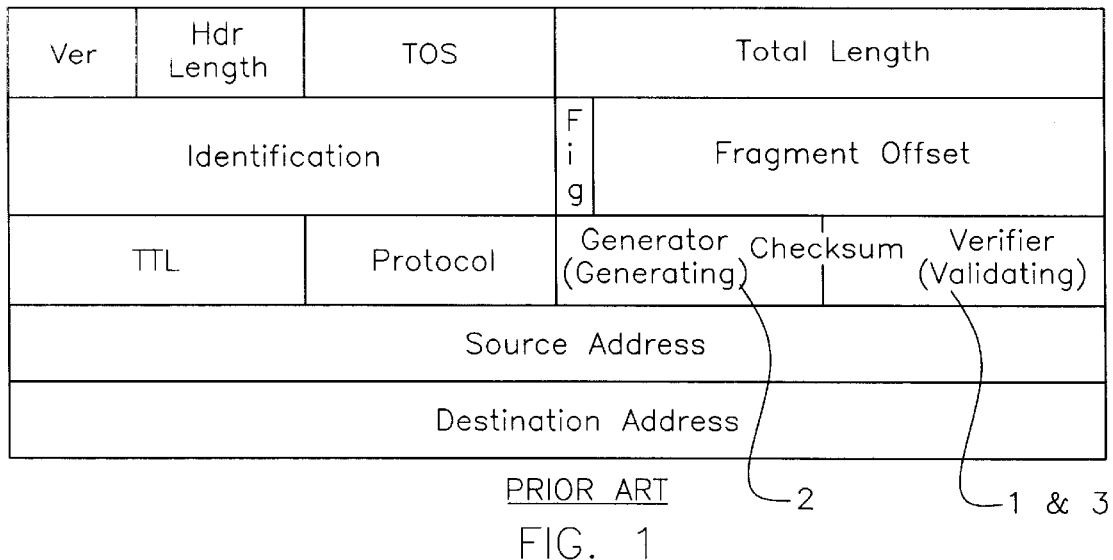
PRIOR ART
FIG. 1
PRIOR ART
FIG. 2

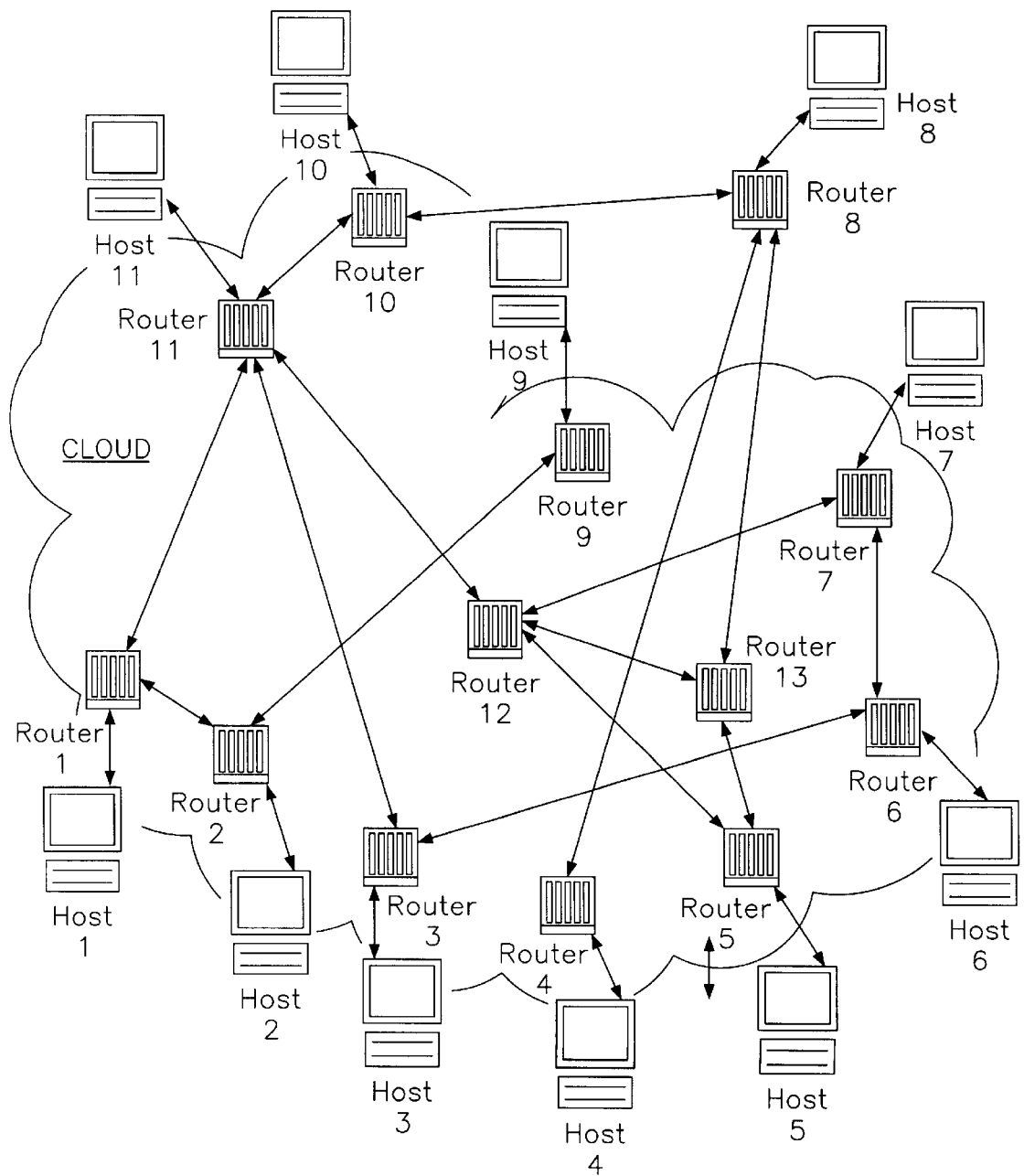
PRIOR ART
FIG. 3

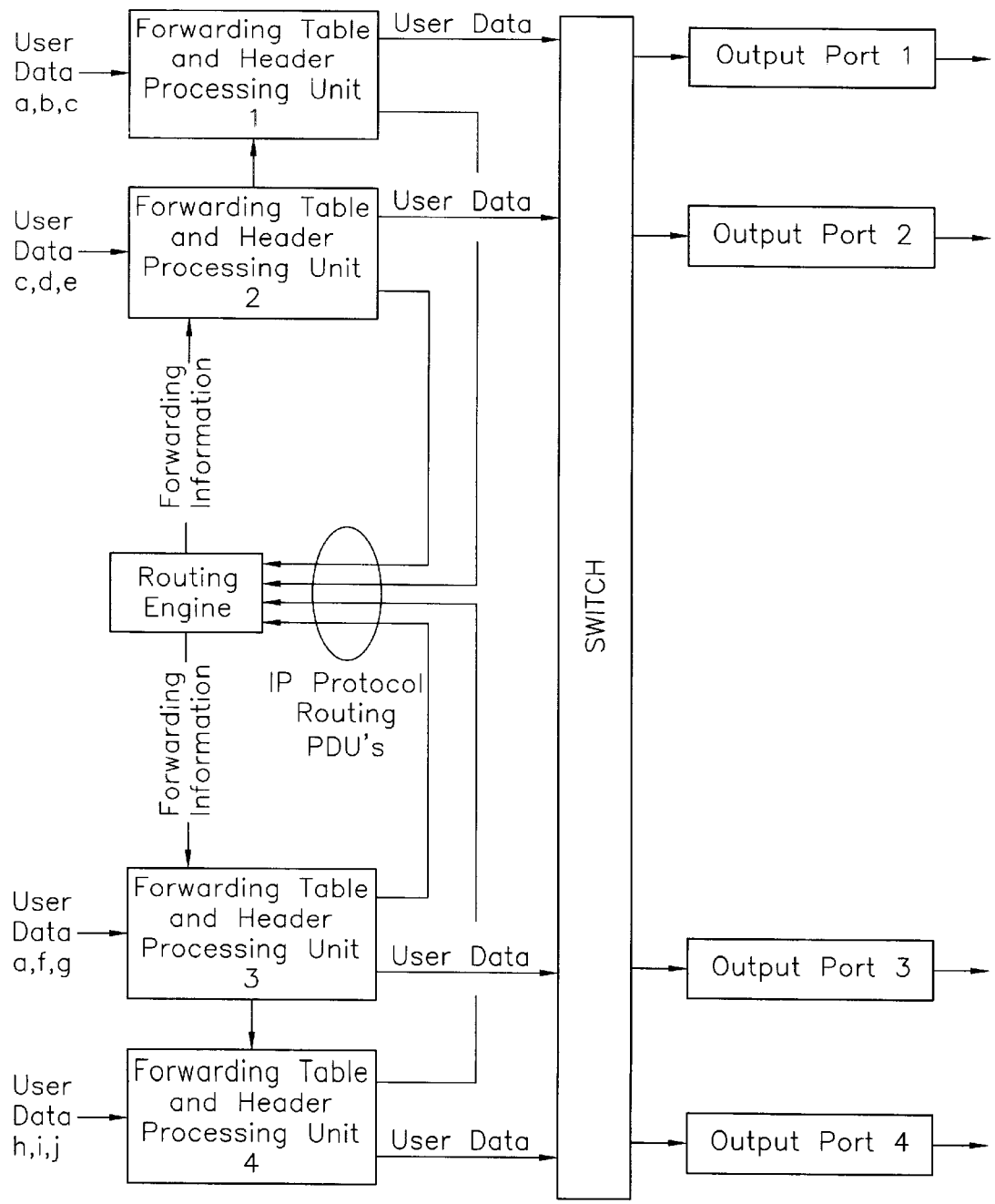
PRIOR ART
FIG. 4

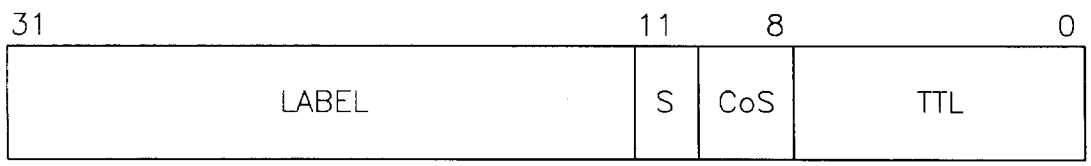
PRIOR ART
FIG. 5
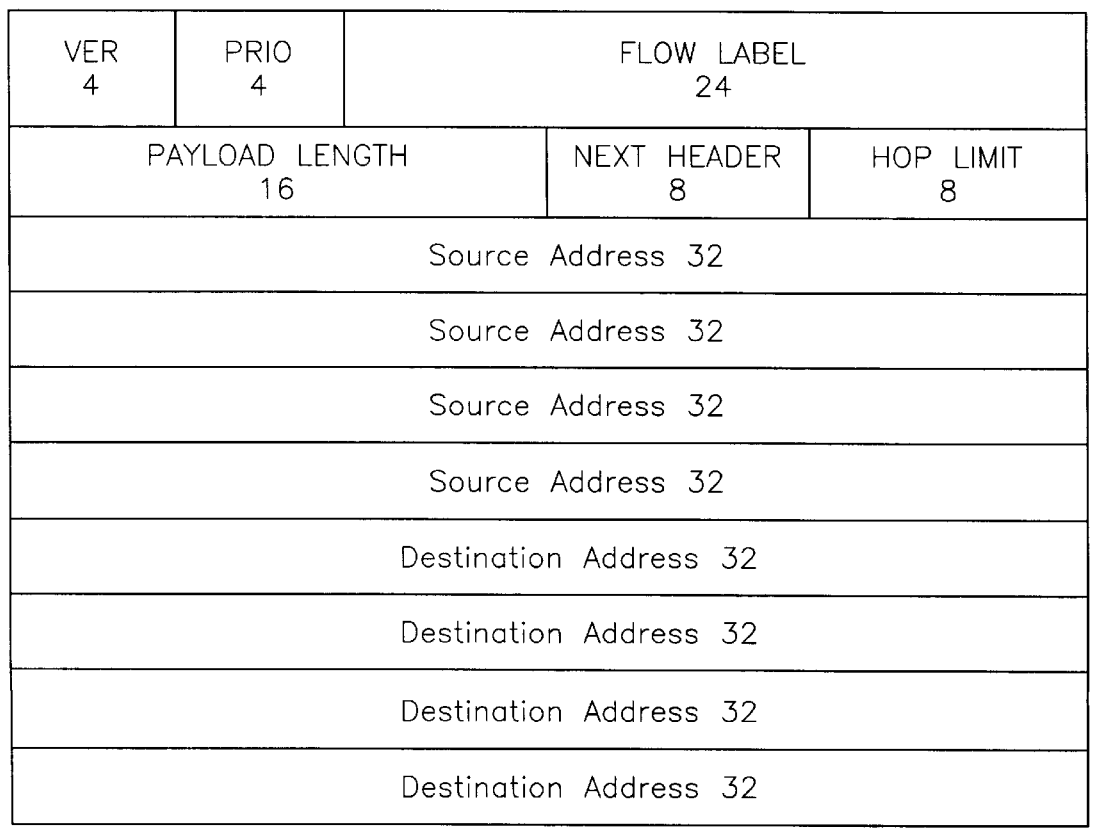
PRIOR ART
FIG. 6

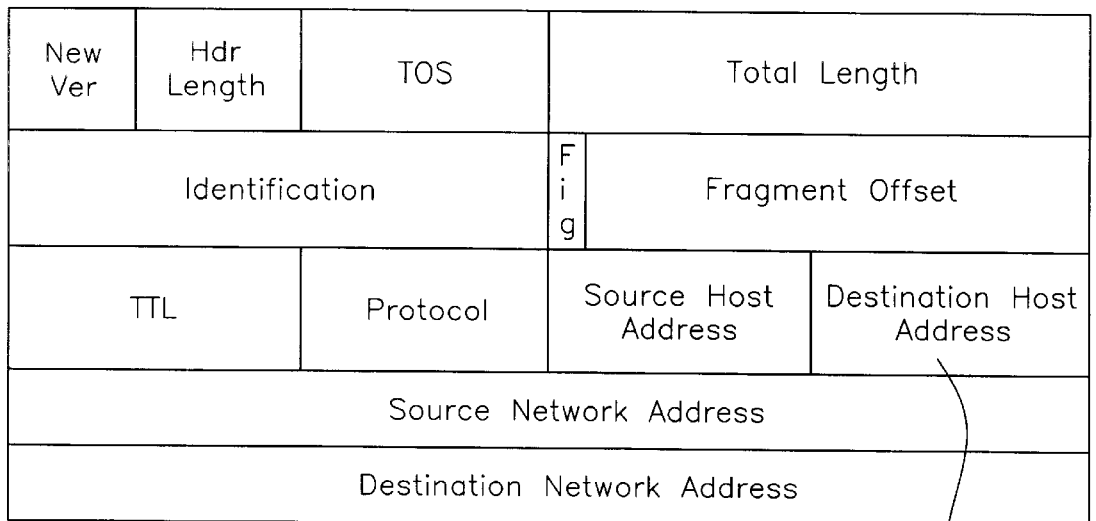
FIG. 7
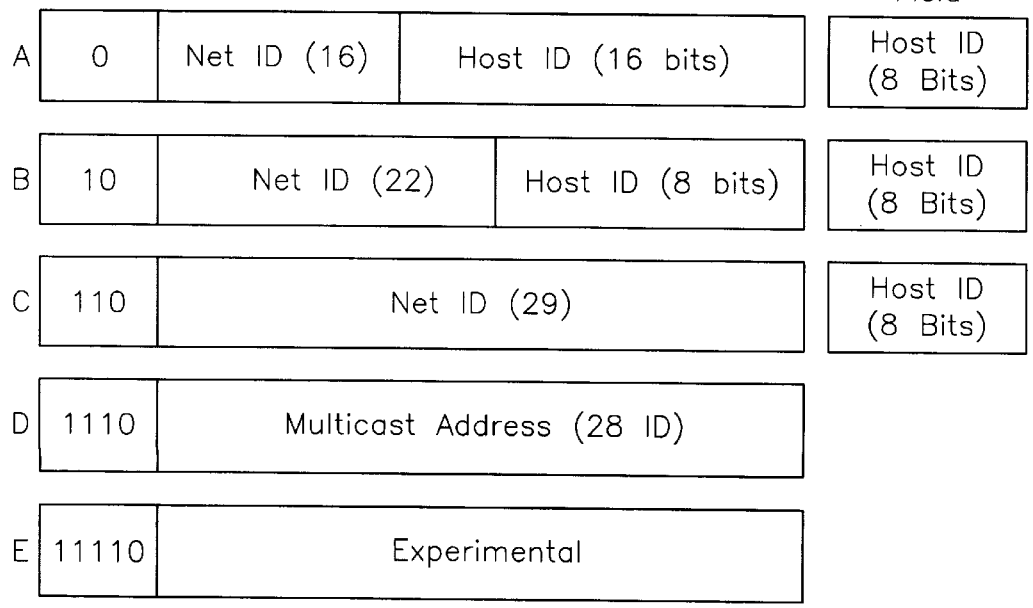
FIG. 8

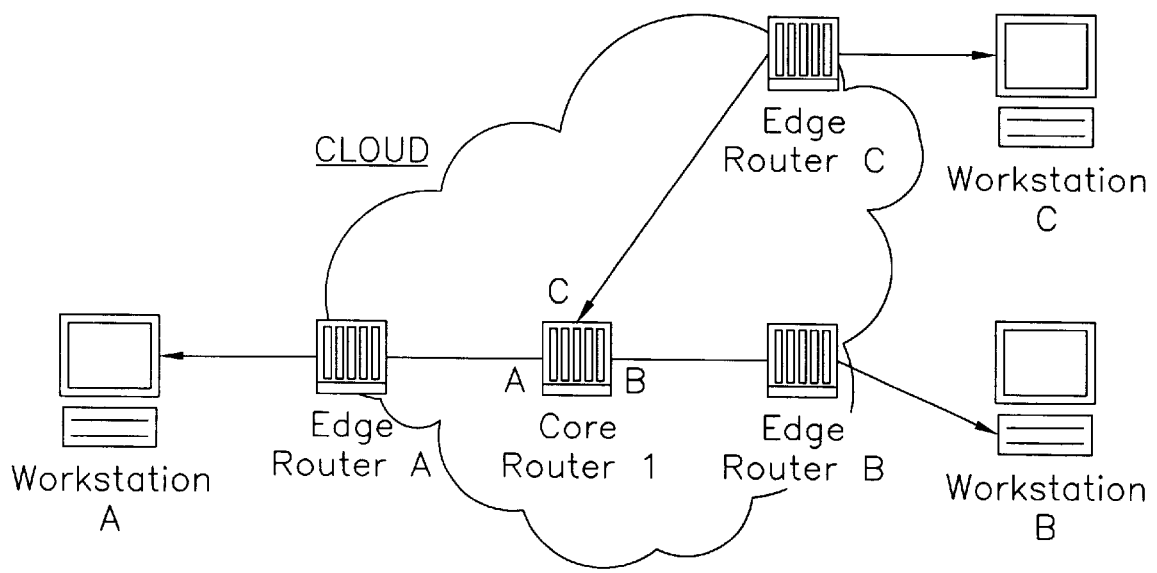
PRIOR ART
FIG. 9

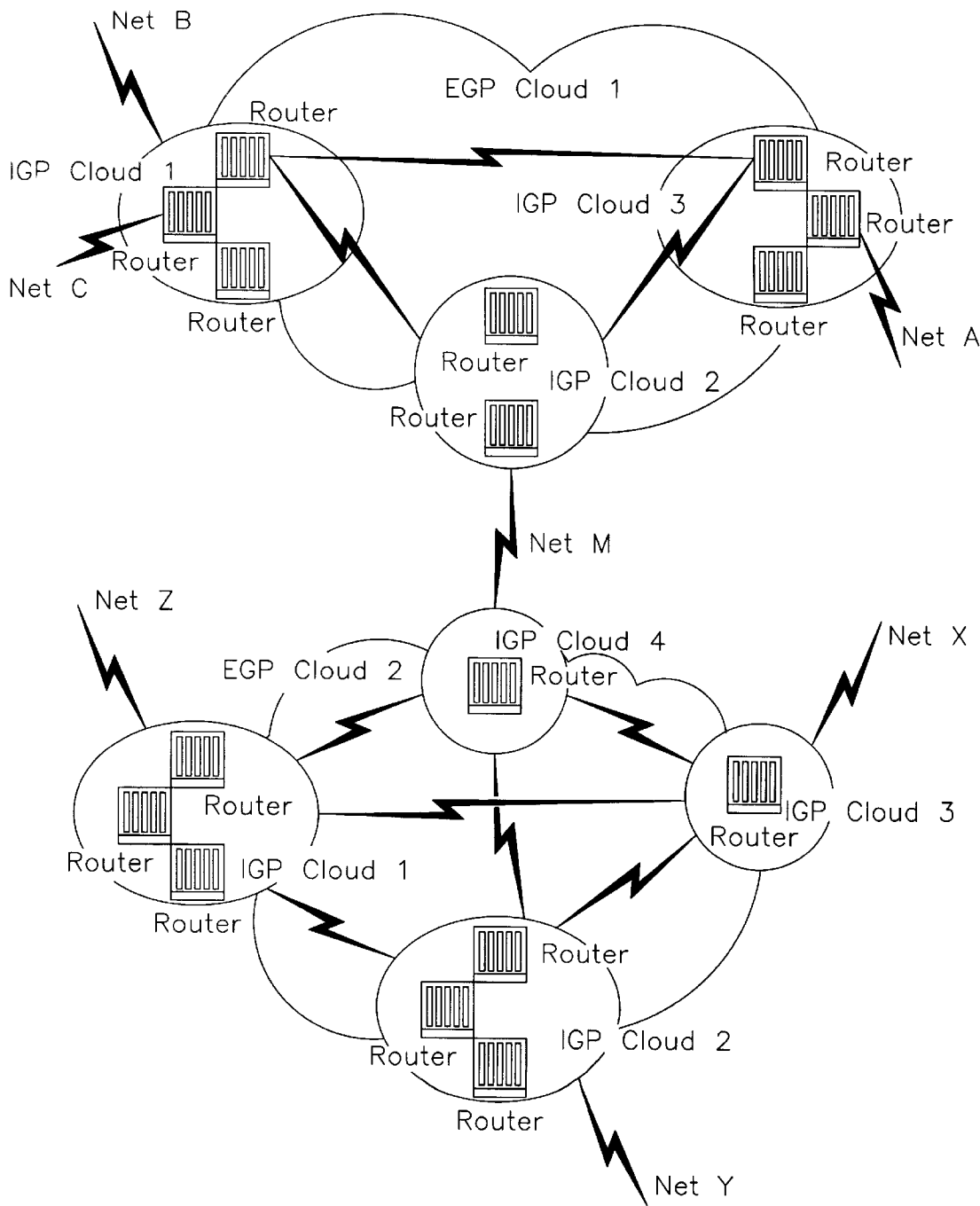
PRIOR ART
FIG. 10

INTERNET AND RELATED NETWORKS, A METHOD OF AND SYSTEM FOR SUBSTITUTE USE OF CHECKSUM FIELD SPACE IN INFORMATION PROCESSING DATAGRAM HEADERS FOR OBVIATING PROCESSING SPEED AND ADDRESSING SPACE LIMITATIONS AND PROVIDING OTHER FEATURES

The present invention relates to networking systems and the forwarding and routing of information therein, being more particularly directed to the limitations of addressing space and processing speeds in the current Internet; the invention providing for novel substitute or reuse of the checksum field space within current IP datagram headers for solving such problems while maintaining current infrastructure, and thereby avoiding resort to costly solutions involved in adopting and investing in non-standard technologies for achieving these ends.

GENERAL BACKGROUND OF INVENTION

Internet was an outgrowth of the ARPANET as had been designed as a research project by BBN Inc after it was awarded a grant from the U.S. Government Defense Department in the sixties and seventies. No one, however, could have imagined the explosive growth of the Internet experienced in the last decade, primarily as a consequence of the technology created by the grant, and now called the Internet Protocol (IP for short). With the explosive growth of this technology, processing speed and addressing bottlenecks have been created, leading to proposals that may force the industry to adopt completely new technologies involving drastic changes in infrastructure that would create a huge economic impact. Foreseeing such economic impact, it has become difficult for the industry to adapt to, or come to consensus on, the next new standard technology.

Currently, there are two major directional changes; one that addresses the processing speed of network datagrams, called IP packets, and the other that addresses the 'addressing limits' of the IP packets. These two directions have been pushed by the industry for some time but have not been agreed upon by any engineering committee. Finalization of these standards involves serious consideration of substantial new investments in technology and in the justification of obsoleting billions of dollars worth of previous investment.

With the breakthrough of the present invention, however, the current IP structure itself may be retained, adapted and used to solve not only both the processing and addressing speed problems, but also to solve ancillary problems, in many environments, as well, and without changing the current infrastructure, and with continued use of current technology.

OBJECTS OF INVENTION

An object of the invention, therefore, is to provide a new and improved method of and system for obviating processing and addressing speed limitations in Internet Protocol (IP) and related applications that shall not be subject to the above-described and other disadvantages of requiring new and costly infrastructure changes, but that, through novel reuse of the checksum field space in the IP datagrams, can admirably remedy such speed limitations and, where desired, provide additional features, as well.

A further object of the present invention is to provide a novel technique for reusing the checksum field space in the header in the current Internet or private IP networks for increasing the processing speed of Internet datagrams, thereby increasing the overall delivery service in the Internet.

Still another object is to provide for such reuse of the checksum field header space, in current internet or private IP networks also for speeding up datagrams for Virtual Private Networks (VPN) and the like.

From another important viewpoint, the invention encompasses in a data networking system the modification of headers of datagrams requiring insignificant changes in the current private or public IP networks, while allowing growth in various aspects of public and private networks; and thereby protecting current industry investments by maintaining backward compatibility.

Other and further objects will be explained hereinafter and are more fully delineated in the appended claims.

An additional object is to provide for such reuse of the checksum field for representing one or more of Autonomous System Numbers, or higher layer protocol-based routing or for any tag representing identifiers as for such VPN use, or for representing later-described MPLS or other layer 2 protocols.

SUMMARY

In summary, however, from one of its important viewpoints, the invention embraces in a network system for exchanging information between two or more computer hosts connected to the system with the aid of datagram headers of predetermined size for routing and forwarding the information, with the headers containing source and destination network address fields and other service and identification fields, including a checksum field for generating checksums guaranteeing the validity of the header, a method of extending the network address space while increasing processing speed and, if desired, maintaining the same predetermined header size, that comprises, replacing the checksum usage of the checksum field with its attendant processing time with further source host and destination host addresses of lesser attendant processing time, increasing the address space for the network and decreasing the required header processing time.

From another important view point, the invention encompasses in a data networking system the modification of headers of datagrams requiring insignificant changes in the current private or public IP networks, while allowing growth in various aspects of public and private networks; and thereby protecting current industry investments by maintaining backward compatibility.

Preferred and best mode designs and details are later presented.

DRAWINGS

The invention will now be described with reference to the accompanying drawings, FIG. 1 of which is a diagram of a conventional IP header;

FIG. 2 is a diagram illustrating the different classes of IP addresses currently used;

FIG. 3 illustrates a simple representation of a current Internet interconnection of hosts and routers;

FIG. 4 is a high level block diagram of an inter-networking mode;

FIG. 5 is a diagram of a proposed new MPLS header;

FIG. 6 is a diagram of a proposed new IPv6 header;

FIG. 7 is a novel IPv4 header constructed in accordance with the present invention;

FIG. 8 diagrams classes using the IPv4 new header of the invention;

FIG. 9 demonstrates the elements of a typical network connection; and

FIG. 10 illustrates an example of use in the Internet.

BACKGROUND AS TO PRIOR HEADER USE

Datagrams that flow through the Internet have a header followed by the information that needs to be exchanged between two or more computer hosts in the Internet (later-discussed FIG. 3). This header is shown in the example of FIG. 1 as starting with a Version Number (Ver), currently assigned a value of 4. The next four bits represent the length of the header field (Hdr Length) in long words (32 bits). For almost all data packets on the Internet, this value is 5, which makes the header 20 bytes long. This number increases, however, if the datagrams are of special type, called Options packets. The next 8 bits are called ToS bits, representing the Type of Service that is assigned to this datagram. Different applications have different service requirements for delivery from the network which are encoded in the ToS field. The next field is the Total Length of the datagram in bytes, limiting the length of the IP datagram to $2^{16}$; i.e. 65535 bytes. The next 16 bits, called the 'Identification' field, uniquely identifies each datagram sent by a host. The next two fields are flag (FLG) and Fragmentation Offset fields which are used to segment datagrams and reassemble them as they travel through networks that have limitations on the maximum size of datagrams.

The next field shown in the IP Header of FIG. 1 is called the Time To Live or TTL field, which is responsible for limiting the number of hops a datagram may make through a network. This field decrements at each Networking Node in the network. If this field reduces to zero before reaching the desired destination, the datagram is dropped. This mechanism prevents infinite looping between two Networking Nodes because of some routing error.

The next field is the Protocol field, used by the hosts to distinguish the higher layer application for which this datagram is intended. This allows for simultaneous multiple applications to exist between the same two hosts ("Verifier" at 3). Header Checksum 1 is the next field, which normally provides the checksum generating function ("Generator" at 2) and guaranties the validity of the header. The Checksum is calculated over the entire header and stored in the header.

Followed by this field are two addresses; the Source network Address and the Destination network Address. Each host is assigned a unique address which allows a network to forward the stream of datagrams from one node to the other. It is almost like the postal service, where each client has a unique address, thereby allowing postal agencies to forward the message from any user to the final client.

Each host in the Internet is assigned a unique 32 bit address, restricting the total number of addresses to $2^{32}$ or 4 billion hosts. The addresses are not evenly distributed to all hosts in the world. The addresses are divided into classes A to E, as shown in FIG. 2. Within a class, an address is divided into two components, a host address and a network address. In Class 'A', there are 128 networks each with $2^{24}$ hosts. In Class 'B', there are $2^{14}$ networks with up to $2^{16}$ hosts. In Class 'C', there are $2^{21}$ networks with up to 256 hosts each. Class 'D' is a multicast group with $2^{28}$ addresses; and finally, Class 'E' has $2^{27}$ for experimental purposes. The most commonly assigned Class is Class 'C'. This allows 2 million networks, each with 256 hosts, but it is, however, running out of space by the explosive growth of the Internet.

The above-described addressing scheme has turned out to be inefficient use of the addressing space and a newer Classless Inter Domain Routing (CIDR), as described in a IETF document RFC 1519, is most commonly used in the Internet for distributing Network Addresses. In CIDR based networks, masks are not fixed (as described in Class-based addressing above), but are de-coupled from the Class of the network address. As described in the above-mentioned IETF document, CIDR allows more efficient use of Network Addresses. Throughout this discussion, however, invention Class based addressing is described for the ease of discussion; however, the invention applies to both types of addressing schemes.

In the simplified Internet representation of before-mentioned FIG. 3, datagrams are forwarded from a source to a destination in an automatic manner. From the sender's point of view, it only knows the destination address and does not know the route by which the datagram reaches the final destination; and in most cases, it does not need to know the route, being mostly interested just in delivering the datagram to the destination. Using the postal agency analogy, when we post mail, we are usually interested in ensuring that the message reaches the destination, and it does not matter how the agency routes the mail For the automatic delivery of IP datagrams, a harmonious coexistence of IP Routing Protocols is provided, running on intermediate networking nodes inside the Internet, the IP Routing Protocols being intelligent mechanisms on each internetworking node that share information about networking addresses with other internetworking nodes via Routing datagrams called IP Routing PDU's. The IP Routing Protocols on each internetworking node create and maintain databases that allow it to forward ingress datagrams to the next internetworking node on the way to ifs final destination. In the representation of FIG. 3, for example, 11 Hosts are shown connected to a network of 13 Routers, which are geographically independently located, and each networking node, called Router, has connection to a subset of the total number of networking nodes. There may not be a fully meshed interconnection; i.e. each Router may not be connected directly to every other Router in the network. In the postal service analogy, every post office is not connected directly to every other post office in the world.

As an example, assume that Host 1 would like to send a datagram to Host 9. Host 1 could achieve this in a few ways, by sending the datagram to Router 1. Router 1 may then forward the datagram to Router 2, and then Router 2 forwards the datagram to the ultimate destination Router 9, which then forwards it to Host 9. Host 1 could also have sent the datagram to Router 1, with Router 1 then forwarding the datagram to Router 11, which then forwards to Router 10, which then forwards to Router 8, and then finally Router 8 may forward the datagram to Router 9, that in turn sends it to Host 9.

The way in which Router 1 knows to which Router it is forward the datagram to ( Router 2 or Router 11 in the above example, and with the same question raised at every internetworking node of the Internet), is through the use of the many coexisting IP Routing Protocols that collectively provide this service to create a network in a non-fully meshed connected Internet. Each Router creates a database of hierarchical topology of destination network addresses that it learns from other Routers via the Internet Routing Protocols, called a Routing Table. From the Routing Table, each Router creates another database, called a Forwarding Table, which maps a destination network address to one of its interfaces; meaning, that if a Router gets a datagram from a Host or other Router from a directly connected interface, then by examining the destination network address in the header, it knows which one of the local interfaces to which to forward the datagram. Using these two tables, the Routing Table and the Forwarding Table, later more fully discussed, a datagram that enters the network can thus be forwarded to the eventual destination by examining the datagram header and looking up the Forwarding Table to find the next interface to which to send the datagram.

There are two very popular IP Routing Protocols, BGP and OSPF, for which there is currently development being considered by standardizing bodies, two of which proposals have direct importance for the breakthrough of the present invention, the IPv6 and the MPLS, later more fully explained. IPv6 is a proposal to solve some of the address space limitations. MPLS, on the other hand, is a proposal to streamline the Forwarding Process of IP Datagrams. One of the common themes of the two proposals is to discard any Checksum field at the IP header layer. Underlying the present invention, however, is the discovery of the remarkable advantages that can be obtained in keeping the Checksum field space in the header (later described at 1' in FIG. 7) and using it for increasing the addressing space and thereby reducing addressing problems by such reusing of the former Checksum space (1, FIG. 1). Further, the current invention, in addition, looks very similar to the MPLS structure and thereby enables elimination of the need for MPLS.

Thus, the present invention, unlike the currently advanced Ipv6 and MPLS proposals, provides for keeping the current header size, but with a mechanism that allows the current Internet or private IP networks to grow beyond the current address space restrictions by minimally changing the IP header, and in ways that render it backwardly compatible with existing infrastructure; thereby protecting the current investment of the industry, as earlier mentioned.

It is accordingly in order to proceed to describe the details of the IPv6 and MPLS current proposals of other groups, better to contrast their disadvantages in comparison with the technique underlying the present invention. Considerations In Header Processing and Forwarding.

The limitations in such prior art IP datagram header processing overcome by the present invention will now more fully be addressed. Considering the processing required to accept and forward an IP datagram in an IP networking node, the node has to process the IP header of FIG. 1 comprising the Header Version, Header Length, Datagram Length, TTL field and Checksum field, as before explained. The egress interface of the datagram is then determined based on the incoming Destination Address in the incoming IP datagram; i.e. Forwarding, FIG. 4. Once a header is verified, the data is either sent to another port in the networking node or to a Routing Engine within the networking node. A typical architecture of a Router networking node is illustrated in previously described FIG. 3, implemented with a Routing Engine, so-labeled in FIG. 4, connected to multiple interfaces of the networking node. All IP Routing Protocol data destined for the Routing Engine are forwarded to the Routing Engine by all ingress ports. The Routing Engine examines the Routing Protocol PDUs and learns destination network addresses of the various networks, and then calculates the egress interface number for the network addresses. The destination network address and egress interface number form an entry into the Forwarding Table. The Routing Engine then sends the Forwarding Table or updates thereof to each ingress interface, thereby instructing each ingress header processing unit (Units 1–4 in FIG. 4) how to determine the exit interface of each incoming datagram. Each ingress header processing unit will then verify every datagram and then examine the destination field, "walking through" the Forwarding Table to find out the egress port number of the datagram.

An exemplary process will now be detailed, using the high level networking node diagram of FIG. 4. Assuming some combinations of IP Routing Protocols, Routers attached respectively on the other side of Units 1, 2, 3 and 4 are respectively advertising reachability to network addresses a, b and c, to network addresses c, d and e, to network addresses a, f and g, and finally, to network addresses h, i, and j. In this simple example, the Routing Engine sees multiple exit or output ports, labeled as Output Ports 1–4, for destination network addresses a and c. The Routing Engine will decide, based on one of many options, such as cost, hop count, etc., the best exit port to reach destination network address 'a' and destination network address 'c'. Assuming for this example that the Routing Engine chooses the interface to port 1 for the forwarding of all datagrams destined for network address 'a', and it chooses port 2 for the forwarding of all datagrams destined for network address 'c', based on this information, the Routing Engine will thereupon create the Forwarding Table shown in Table 1, below. Each network address, a to j, is listed within parenthesis as four numbers which represents the real network address as four bytes.

TABLE 1

FORWARDING TABLE FOR EXAMPLE IN FIG. 4.

| DESTINATION NETWORK ADDRESS | EGRESS PORT NUMBER |
| --- | --- |
| a (a0.a1.a2.a3) | 1 |
| b (b0.b1.b2.b3) | 1 |
| c (c0.c1.c2.c3) | 2 |
| d (d0.d1.d2.d3) | 2 |
| e (e0.e1.e2.e3) | 2 |
| f (f0.f1.f2.f3) | 3 |
| g (g0.g1.g2.g3) | 3 |
| h (h0.hl.h2.h3) | 4 |
| i (i0.i1.i2.i3) | 4 |
| j (j0.j1.j2.j3) | 4 |

This table is then forwarded to each input or ingress data port by the Routing Engine to permit the Header Processing Unit to examine all incoming datagrams and match the destination address in the Forwarding Table and thereby determine the corresponding appropriate output or egress interface port. The datagram is then sent to that output port via the switch, so-labeled.

Summarizing, thus, the processing required at the data input or ingress port of each router, the input or ingress Header Processing Unit first verifies the integrity of the incoming datagram header, FIG. 1. The Header Processing Unit then pattern-matches the destination address in the incoming datagram header to determine the appropriate output port interface number. In practice, the Forwarding Tables on a backbone Router (such as Table 1, above) can extend to tens of thousands of entries. The pattern-matching is therefore a tedious task and different algorithms are designed to speed up the searching method. The most common way of searching network addresses uses an appropriate hashing algorithm. Creating a memory size of $2^{32}$ words will accommodate the entire network spectrum, allowing just one memory read, indexed by the destination address in the incoming header, to result in the output interface number. A memory size of $2^{32}$ words, however, is not only costly but also consumes a lot of circuit board space in current technology implementations. Large memory systems do not, indeed, provide a practical solution for current Routers. Even if memory size is reduced and a hashing algorithm is used to search a sorted list of Forwarding Tables, such a mechanism still is neither deterministic nor fast.

With the present invention, on the other hand, through reduction in the verification process of the IP header, internetworking throughput is thereby increased. Furthermore, the invention enables reducing the memory size required to find output or egress interfaces from $2^{32}$ down to $2^{16}$, with only 64 k memory decidedly not presenting an issue for current applications to support and to reduce cost and board space, by encoding Autonomous System numbers in the newly created substitute use of the checksum field (described in more detail during the Preferred Embodiments of the invention as shown in FIG. 7).

Considerations In Address Limitations

Not only does the present invention thus improve header processing and forwarding, but it also relaxes current system address limitations, as well. Current IP networks assign addresses in one of three classes, earlier discussed in connection with FIG. 2, each address having a Network Address and a Host Address and with the class of addresses grouped based on the size of the network; i.e. the number of hosts connected to the network. For example, Class A has $2^{24}$ (16 million) hosts on each of the $2^7$ (128) networks; Class B has $2^{16}$(64k) hosts on each one of the $2^{14}$ (16k) networks; Class C, has $2^8$ (256) hosts on each of the $2^{21}$(2 Million) networks.

On the current public IP networks, Class C addresses and/or CIDR blocks are beginning to run out, generating fear of resource exhaustion, and additionally making owning IP addresses a commodity, while reducing the expansion of IP Internetworking. The ultimate goal, of course, is to increase IP space to continue the growth of the Internet.

The IPv6 Proposal

To overcome this IP Addressing Problem, the IPv6 of FIG. 6 is now being proposed. This requires a completely new header with more bytes in the header and with less verification. The new header eliminates the Checksum field and increases the IP network address size, also adding hierarchical addressing schemes. As before stated, the Checksum field was originally designed as an integral part of the IP datagram at an earlier time when memories were very expensive and the transmission lines were susceptible to error, requiring the header Checksum as a mechanism for verifying memory subsystem and transmission line failures. With the proposed new IPv6 header and the Checksum field elimination (because its usefulness is thought to be minimal in current technology implementations for IPv4 headers), there will have to be ultimate approval of the new header by standards bodies, and then all major companies will have to embrace this new IP header structure. Where the new IPv6 is not compatible with the present header systems, however, resistance is anticipated to the accepting of the new header, and this whole process is expected to involve several years of debate amongst implementers, equipment, resellers, and ultimate end users, among others.

Again, the present invention avoids such problems, allowing substantial growth in the extension of network address space, with backward compatibility and minimal changes in current infrastructure; thereby reducing, or perhaps even eliminating the requirement to embrace a new header of the IPv6 type.

The MPLS Proposal The previously mentioned MPLS proposal is being championed by an MPLS group within the IETF, urging the use of labels appended to the current IP Header to switch IP datagrams faster and more efficiently. The label is shown in FIG. 5, and it contains a 20 bit Label, an eight bit TTL, a three bit CoS (Cost of Service) and a single bit indicating End of Stack (S). The concept is to distribute labels to neighboring networking nodes, during routing updates, that represent a single or a collection of networking addresses to neighboring Routers using a new protocol called LDP. These labels have local significance to the Router that expects datagrams on that MPLS Label. Once the label-appended datagrams arrive at a node, it simply uses the 20 bit Label to switch the datagram to the output or egress port, thereby reducing the hashing time required to find the entry in the Forwarding Table. If the labels are created intelligently, one can distribute labels that results in better switching. There can also be multiple MPLS headers requested in the adjacent Router. A single 20 bit label being advertised, for example, may result in a one million table lookup, with such lookup being deterministic and being accomplished in one read of memory.

Assuming the earlier discussed example of FIG. 4, but now to demonstrate MPLS operation, if the Routing Engine chooses the interface to the output port 1 for forwarding all datagrams destined for network address 'a', and it chooses the interface 2 for the port 2 for forwarding all datagrams destined for network address 'c', a Forwarding database will be generated as shown in the following Table 2. This Forwarding Table 2 will contain an additional entry representing Label Number assigned to the Destination Network Address. Assuming similar actions to be performed on the Labels by the Internetworking node, only four Labels are distributed (L1–L4), as follows:

TABLE 2

| MPLS FORWARDING TABLE | | |
| --- | --- | --- |
| DESTINATION NETWORK ADDRESS | LABEL ASSIGNED | EGRESS PORT NUMBER |
| a (a0.a1.a2.a3) | L1 | 1 |
| b (b0.b1.b2.b3) | L1 | 1 |
| c (c0.c1.c2.c3) | L2 | 2 |
| d (d0.d1.d2.d3) | L2 | 2 |
| e (e0.e1.e2.e3) | L2 | 2 |
| f (f0.f1.f2.f3) | L3 | 3 |
| g (g0.g1.g2.g3) | L3 | 3 |
| h (h0.h1.h2.h3) | L4 | 4 |
| i (i0.i1.i2.i3) | L4 | 4 |
| j (j0.j1.j2.j3) | L4 | 4 |

These Labels increase output on ingress data processing speed because of two major changes in the header: 1) omission of the Checksum in the header, allowing faster processing; and 2) labels principally of only 20 bits, accommodating the entire table in one megabyte of data.

The use of these labels does address some of the earlier-discussed issues with the current IP networking technology. The first result accomplished by the MPLS proposal is eliminating Checksum-like features, thereby to increase datagram forwarding rates. Secondly, the labels being of local significance, reduce required memory size for the Forwarding Table. The drawbacks, however, are the following: First, the MPLS is a completely new protocol and requires different header processing. Secondly, MPLS labels that need distribution are still undefined in the proposal and are expected to take some time to define. Thirdly, MPLS completely fails to address the 'IP addressing space' issue. Fourthly, network managers will have to design networks with clusters of these MPLS-compatible nodes to take advantage of the switching; and fifthly, in order to take advantage of the proposal, MPLS new hardware has to be introduced, which causes a radical change in infrastructure and more commitment from vendors towards this new proposed technology.

PREFERRED EMBODIMENT(S) OF THE INVENTION

Returning to FIG. 1, the processing that is required at the ingress of each Router interface, is itemized below. Along with each item, a number is presented in parenthesis which indicates the number of data memory accesses required to perform the function.

1. Verify that Version Number is 4. (1 read)
2. Verify that Header Length is 5. (1 read)
3. Verify that IP length is greater than 20. (1 read)
4. Verify that TTL field is greater than 1. (1 read)
5. Add all ten 16 bits words and compare it to 0xffff. (10 reads)
6. Decrement TTL field by one. (2, one read and one write)
7. Add all 9 (exclude Checksum field) and do a one's complement and store in Checksum field 1. (10–9 reads, and 1 write).

Assuming that the datagram is in memory, discounting CPU instruction fetch time, it takes a total of 26 memory accesses just to process the datagram header. The number of instruction fetches depends largely on processor type, processor cache size, processor architecture, etc. Items 5 and 7 above, however, are used purely for Checksum, which constitute 20 of the 26 memory accesses.

In accordance with the present invention, as will later be described, while it is appreciated that the Checksum function is actually redundant, there is great advantage in still keeping the Checksum space or equivalent in the header, but reusing it in a novel manner (1', FIG. 7), to save up to 20 such memory accesses and thereby decrease the total processing time of the datagram. Secondly, with the invention, other uses of the Checksum field space or equivalent in the header can be activated in public and private IP networks that greatly enhance the forwarding speeds and reduce some of the bottlenecks in the networks.

This invention thus centers around the concept of the substitute usefulness of the space provided by the Checksum field 1 in the current IP header, shown in FIG. 1. While, as above shown, the two new current proposals of other groups—IPv6 and MPLS—are suggesting no Checksum field space or equivalent in their headers, the present invention keeps the same header, but uses what was the Checksum field thereof for solving the problems in a public or a private IP network of adding address space, enabling Label Switching as in the MPLS proposal or the like, providing VPN support, etc.—all with minimal changes in the current infrastructure, mainly because the header still remains the same size and has the same definitions, except what was the Checksum field (1, FIG. 1) now has a different substitute use (1', FIG. 7).

Input Or Ingress Processing Using The Invention

For ease of reading, the entire present-day header checking IP Header processing is tabulated in Table 3, below, including, also, the processing now required in accordance with the present invention. The total processing, as illustrated by the final row in table 3, suggests a greater than 75% reduction in header processing. The processing listed only represents the memory accesses to fetch the IP header and does not include any CPU fetch times, so that the results are not an absolute true representation of saving, but this still provides a good indicator of size of the savings. The number of cycles saved by the invention becomes more appreciable when trying to process datagrams at higher speeds, where memory cycles start to become comparable to packet rate on the wire. For example, on an OC48, a 64 byte packet takes 207 nSec. With an optimistic memory cycle of 10 nSec, this would result in 260 nSec to process the header.

TABLE 3

COMPARING PROCESSING CYCLES OF IP DATAGRAMS- CURRENT AND WITH INVENTION

| DESCRIPTION | CURRENT PROCESSING CYCLES (FIG. 1) | PROCESSING CYCLES IN INVENTION (FIG. 7) |
|---|---|---|
| Verify Version Number | 1 | 1 |
| Verify Header Number | 1 | 1 |
| Verify IP Length | 1 | 1 |
| Verify IP Checksum (at 2, FIG. 1) | 10 | Eliminate |
| Verify TTL field is greater than 1 | 1 | 2 |
| Decrement TTL | 2 | 2 |
| Generate New Checksum | 10 | Eliminate |
| TOTAL | 26 | 6 |

The savings in IP Header processing time with the invention, moreover, does not come at the expense of any significant measurable reliability loss. This invention thus goes beyond eliminating some legacy processing in IP datagram headers, suggesting, rather, some usage of the field for eliminating various restrictions.

IP Addressing Space Extension Using The Invention:

As mentioned earlier, the IP Address is split into classes A–E, FIG. 2. In Class C, the number of networks allowable is $2^{21}$(2 million). Class C addresses or CIDR blocks, as previously explained, are more common on the current public Internet, and the explosive growth has the technologists and standards bodies looking for solutions outside the current IP header. The solution they are looking for is to result in a standard such as under the beforedescribed IPv6 proposal.

By not eliminating the Checksum space of the header but rather replacing the Checksum generating function thereof and changing its use, the present invention uses that Checksum field space to increase the address range. There are many formats that may be used for so rearranging the 16 bit Checksum fields in the IP Header of the invention—one such format being illustrated in FIG. 7, where the format is chosen to have the least impact on the current IP network infrastructure. This new format of the invention suggests making all A–C classes extend the current Network Address by eight bits, and flowing the lower 8 bits of the Host address into the old Checksum field, as in FIG. 8 (labeled "source" and "Destination Host address " in FIG. 7). The reason for not extending the Multicast and the Experimental Classes is to reduce the agitation; but there is no reason why Multicast and Experimental Classes can not also be extended, if desired. The new format also suggests replacing the Version Number to something new, e.g. 8, representing the address extension by eight bits. The New Class structure thus created, as listed in FIG. 8, proposes that Class A has 32k networks, Class B has 4 Million networks, and Class C has ½ Billion networks, as an example. This allows 256 times growth in the network addressing, which should survive the IP growth for years.

It might be argued that this additional address space itself will ultimately succumb to the demands at some future time; but the present invention still provides, for the first time, an address range exceeding to about 10 hosts per person on the entire globe, and about one Class C network per about every 10 people in the world. The issue that may need addressing is, rather, how big an impact the present invention may have on the current IP internet infrastructure.

FIG. 9 depicts elements of a typical Internet network topology, with Hosts on either end of the network that need to communicate with each other via the network, as in the multi-nets A–Z of FIG. 10, intercommunicating amongst OSPF and BGP clouds. These Hosts are connected to Routers on the edges of the network (Edge Routers) which, in turn, are connected via multiple Core Routers. The most favorable impact to these machines and their corresponding software that appears to be achievable with the proposal of the present invention, as compared to the IPv6 and MPLS current proposals being made in the standards bodies, is summarized below:

The current workstation application software need not change. Workstations that will support this invention will have to set IPvNew (FIG. 7) in the Version Number of the IP Header. The corresponding ARP, ICMP and SNMP service will have to accommodate the IPvNew. This is a major saving in the installed application software infrastructure.

The changes to the Router are minimal. Only when a Router is directly connected to the destination network, does the Router look at the extended address in the checksum field and forwards it to the Host accordingly.

There will be no changes in the Routers in the Core of the Internet.

Since Network Addresses are still restricted to 4 byte addresses, there are no changes to the Routing Protocols.

While there are also other modifications than the above listed software changes, such are relatively small compared to changing the entire infrastructure as would be involved in adopting either the IPv6 or MPLS proposals.

Increase in speed and reduced memory requirement for Core Routers:

In the Core of the Internet, Routing Control Protocols, e.g. BGP, combine a group of Routers into Autonomous Systems (AS) and assigns the same unique number to all routers in the System. Such Autonomous Systems could be represented as 16 bit numbers and stored in the Checksum field, as another use of the invention. This allows Core Routers to forward datagrams by using the 16 bit AS number stored in the Checksum field. Thus the Forwarding Table is then required only to have memory sizes of $2^{16}$ (64k) locations. This will increase forwarding speed, since it simply requires a single read of memory to find the egress port of a datagram.

Let us illustrate the above-mentioned use of the Checksum field by the diagram shown in FIG. 10. In FIG. 10, there are two distinct EGP Clouds; EGP Cloud 1 and EGP Cloud 2 with AS numbers X and Y, respectively. When EGP Cloud 1 learns network addresses from Network B, it will advertise these addresses to EGP Cloud 2. EGP Cloud 2 would now associate AS Number X in its forwarding table entry for network addresses learned from EGP Cloud 2. If all Routers used this invention, then Edge Routers would insert AS Numbers in the Checksum field and every router in the network would associate an egress port per AS number. If some host on network Y wants to communicate with another host on Network B, FIG. 10, then the first Router in EGP Cloud 2 would examine the AS number in the Checksum Field and within one memory lookup would know to forward it towards EGP Cloud 1. When the datagram reaches EGP Cloud 1, the first router would know that the destination is connected to its own network and then it would start to forward, based on the destination network in the IP header.

Use of invention in Virtual Private Networks.

Private network providers, offering connectivity to private institutions, may also use this invention by assigning unique numbers to all ports of the institutions and then forwarding datagrams based on these unique numbers. The added advantage of this scheme above and beyond the forwarding speeds and reduction of forwarding tables size, is the isolation of various private networks in the network.

Use of invention for eliminating MPLS headers

It has been mentioned that in the MPLS proposal a header is inserted on top of the IP header, with forwarding based on the MPLS label, as in FIG. 5. What is most astonishing is that, with the present invention, all of the fields can be incorporated in the current IP header, with the use of the current IP datagram, obviating the need of an additional MPLS header. Examining the fields of the MPLS header in FIG. 5 and the traditional IP header in FIG. 1, we see that both Headers include TTL fields of the same size. Both headers include the CoS/ToS fields. The S field in the MPLS header indicates an end of stack of MPLS headers. The concept of stacking is currently included in the standards, (see RFC 1519). Use of such IP stacking renders the use of the S bit in the MPLS header useless. The only remaining field of the MPLS header, the label field, may, however, be included in the Checksum field using this invention. MPLS defines the MPLS label as 20 bits, allowing one million connections between routers. Using the IP header and this invention, however, the number of such connections would be reduced to $2^{16}$ (64k). For all practical purposes, 64thousand connections between adjacent Routers is more than would be required. It is shown, thus, that using the invention, the creating of a new protocol as defined by MPLS is avoided, and instead the current IP header may be used to accomplish the same function.

As before mentioned, moreover, the invention is also useful for modified headers wherein space is provided for the same or similar such functions as are herein described as incorporated into the current IP header Checksum space—for example, in a rearranged IP header and following the Version Number; and such, as well as further modifications are deemed to fall within the spirit and scope of the invention as defined in the appended clauses.

What is claimed is:

1. In a network system for exchanging information between two or more computer hosts connected to the system with the aid of datagram headers of predetermined size for routing and forwarding the information, with the headers containing source and destination network address fields and other service and identification fields, including a checksum field space originally intended for generating checksums guaranteeing the validity of the header, a method of extending the usefulness of the headers and providing a substitute use for the novel checksum field space) that comprises, eliminating the checksum functions normally performed at the nodes of the network system with their attendant checksum processing time and normally occupying said checksum field space in the header; and substituting in the checksum field space one or more of further source host and destination host addresses of lesser processing time, autonomous system numbers, higher layer protocol-base routing information, Virtual Private Network identifiers, and MPLS protocols.

2. A method as claimed in claim 1 wherein bits normally required in said checksum field for generating checksums are distributed amongst network and host address fields of the header.

3. A method as claimed in claim 1 wherein the number of bits normally required in said checksum field for generating checksums are distributed to extend current network address bits and to provide host address bits in said space of the header.

4. A method as claimed in claim 3 wherein 8 bits are added to the network address field and 8 bits of the host address field are flowed into said space of the header.

* * * * *